US012784426B2

(12) United States Patent
Koenning et al.

(10) Patent No.: US 12,784,426 B2
(45) Date of Patent: Nov. 3, 2026

(54) DATA ENCODING USING IMAGES AND MACHINE LEARNING MODELS

(71) Applicant: SAP SE, Walldorf (DE)

(72) Inventors: Joerg Koenning, Munich (DE); Suat Tabanli, Munich (DE); Hueseyin Dagaydin, Eschelbronn (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 18/771,281

(22) Filed: Jul. 12, 2024

(65) Prior Publication Data

US 2025/0371851 A1 Dec. 4, 2025

(30) Foreign Application Priority Data

May 28, 2024 (EP) .................................... 24178534

(51) Int. Cl.
*G06K 9/62* (2022.01)
*G06V 10/764* (2022.01)
*G06V 10/774* (2022.01)
*G06V 10/776* (2022.01)

(52) U.S. Cl.
CPC .......... *G06V 10/776* (2022.01); *G06V 10/764* (2022.01); *G06V 10/774* (2022.01)

(58) Field of Classification Search
CPC .. G06V 10/776; G06V 10/764; G06V 10/774; G06V 10/82; G06N 3/045; G06N 3/0464; G06N 3/08; G06N 20/00; H04N 19/85; G06F 18/00; G06F 18/214; G06F 18/2163; G06F 18/23; G06T 2207/20048; G06T 2207/20081; G06T 2207/20084;
(Continued)

(56) References Cited

U.S. PATENT DOCUMENTS

2022/0345605 A1* 10/2022 Chuang .................... G06T 5/92

FOREIGN PATENT DOCUMENTS

CN 108694347 B 7/2022

OTHER PUBLICATIONS

Communication: "Extended European Search Report", Nov. 12, 2024 (Nov. 12, 2024), European Patent Office, for European Application No. 24178534.4-1207, 16 pages.

(Continued)

*Primary Examiner* — Duy M Dang
(74) *Attorney, Agent, or Firm* — Buckley, Maschoff & Talwalkar LLC

(57) ABSTRACT

A method includes obtaining a plurality of first data values; creating a first image comprising first pixels, wherein the number of first pixels is equal to the number of first data values and wherein each first data value is assigned to a respective first pixel; providing the first image as input to an image-classification machine learning model to obtain a first numerical output value; obtaining a plurality of second data values; creating a second image comprising a plurality of second pixels equal to the number of second data values and wherein each of the plurality of second data values is assigned to a respective second pixel providing the second image as input to the model to obtain a second numerical output value; evaluating the first numerical output value and the second numerical output value to determine whether the first data values are consistent with the second data values.

15 Claims, 10 Drawing Sheets

(58) Field of Classification Search
CPC ... G06T 2207/20112; G06T 9/00; G06T 9/02; G06T 9/04; G06T 9/008
See application file for complete search history.

(56) References Cited

OTHER PUBLICATIONS

English-language translation for Chinese Publication No. 108694347B, dated Nov. 6, 2024 (Nov. 6, 2024), 32pgs.
Wowo, Kelvin Sopnan et al., "Using Vehicle Data to Enhance Prediction of Accident-Prone Areas", 2022 IEEE 25th International Conference on Intelligent Transportation Systems (ITSC), Oct. 8, 2022 (Oct. 8, 2022, XP034216946, DOI: 10.1109/ITSC55140.2022.992236, [retrieved on Nov. 1, 2022], (pp. 2450-2456, 7 total pages).
Hamza, Ali et al., "Machine Learning Based Classification of crystal system using rendered images from X-ray diffraction (XRD) dataset", Proceedings of 2023 3rd International Conference on Artificial Intelligence (ICAI), Feb. 22, 2023 (Feb. 22, 2023), XP034354536, DOI: 10.1109/ICAI5i8407.2023.10136622, [retrieved on Jun. 2, 2023), (pp. 64-69, 6 total pages).

* cited by examiner

100

| A | B |
|---|---|
| 1 | 0 |
| 2 | 0 |
| 3 | -0.2 |
| 4 | 0.2 |
| 5 | 0 |
| 6 | 0 |
| 7 | 0.2 |
| 8 | 0.2 |
| 9 | 0.75 |
| 10 | 0.5 |
| 11 | 0 |
| 12 | 0 |
| 13 | 0 |
| 14 | 0 |
| 15 | 0 |
| 16 | 0 |
| 17 | -0.5 |
| 18 | 0 |
| 19 | 0 |
| 20 | 0 |
| 21 | 0.2 |
| 22 | 0.2 |
| 23 | 0 |
| 24 | 0 |
| 25 | 0 |

Image 1

| | | | | |
|---|---|---|---|---|
| 0 | 0 | -0.2 | 0.2 | 0 |
| 0 | 0.2 | 0.2 | 0.75 | 0.5 |
| 0 | 0 | 0 | 0 | 0 |
| 0 | -0.5 | 0 | 0 | 0 |
| 0.2 | 0.2 | 0 | 0 | 0 |

Figure 3

| A | B |
|---|---|
| 1 | 0 |
| 2 | 0 |
| 3 | -0.2 |
| 4 | 0.2 |
| 5 | 0 |
| 6 | 0 |
| 7 | 0.2 |
| 8 | 0.5 |
| 9 | 0.75 |
| 10 | 0.5 |
| 11 | 0.2 |
| 12 | 0 |
| 13 | 0 |
| 14 | 0 |
| 15 | 0 |
| 16 | 0 |
| 17 | -0.5 |
| 18 | 0 |
| 19 | 0 |
| 20 | 0 |
| 21 | 0.2 |
| 22 | 0.2 |
| 23 | 0 |
| 24 | 0 |
| 25 | 0 |

Image 2

| | | | | |
|---|---|---|---|---|
| 0 | 0 | -0.2 | 0.2 | 0 |
| 0 | 0.2 | 0.5 | 0.75 | 0.5 |
| 0.2 | 0 | 0 | 0 | 0 |
| 0 | -0.5 | 0 | 0 | 0 |
| 0.2 | 0.2 | 0 | 0 | 0 |

Figure 4

| A | B |
|---|---|
| 1 | 0 |
| 2 | 0 |
| 3 | -0.2 |
| 4 | 0.2 |
| 5 | 0 |
| 6 | 0 |
| 7 | 0.2 |
| 8 | 0.5 |
| 9 | 0.75 |
| 10 | 0.75 |
| 11 | 0.2 |
| 12 | 0.2 |
| 13 | 0 |
| 14 | 0 |
| 15 | 0 |
| 16 | 0 |
| 17 | -0.5 |
| 18 | 0 |
| 19 | 0 |
| 20 | 0 |
| 21 | 0.5 |
| 22 | 0.2 |
| 23 | 0 |
| 24 | 0 |
| 25 | 0 |

Image 3

| | | | | |
|---|---|---|---|---|
| 0 | 0 | -0.2 | 0.2 | 0 |
| 0 | 0.2 | 0.5 | 0.75 | 0.75 |
| 0.2 | 0.2 | 0 | 0 | 0 |
| 0 | -0.5 | 0 | 0 | 0 |
| 0.5 | 0.2 | 0 | 0 | 0 |

Figure 5

| Timestamp | Section | Car | Acceleration |
|---|---|---|---|
| 1 | 1 | 0 | NULL |
| 1 | 2 | 1 | -6 |
| 1 | 3 | 0 | NULL |
| 1 | 4 | 1 | -6 |
| 1 | 5 | 0 | NULL |
| 1 | 6 | 0 | NULL |
| 1 | 7 | 1 | -7 |
| 1 | 8 | 1 | -2 |
| 1 | 9 | 0 | NULL |
| 1 | 10 | 0 | NULL |
| 1 | 11 | 0 | NULL |
| 1 | 12 | 1 | -1 |
| 1 | 13 | 0 | NULL |
| 1 | 14 | 0 | NULL |
| 1 | 15 | 0 | NULL |
| 1 | 16 | 1 | 0 |
| 1 | 17 | 0 | NULL |
| 1 | 18 | 0 | NULL |
| 1 | 19 | 0 | NULL |
| 1 | 20 | 1 | -6 |
| 1 | 21 | 0 | NULL |
| 1 | 22 | 1 | -1 |
| 1 | 23 | 0 | NULL |
| 1 | 24 | 1 | 7 |
| 1 | 25 | 0 | NULL |
| 2 | ... | ... | ... |

Data preprocessing:
A<-5 → 0.75 and +0.25 to adjacent sections
-5 ≤ A ≤ 5 → 0.4 and +0.1 to adjacent sections
A>5 → 0.2 and +0.05 to adjacent sections
NULL → 0

| | | | | |
|---|---|---|---|---|
| 0.25 | 0.75 | 0.5 | 0.75 | 0.25 |
| 0.25 | 0.85 | 0.65 | 0.1 | 0 |
| 0.1 | 0.4 | 0.1 | 0 | 0.1 |
| 0.4 | 0.1 | 0 | 0.25 | 0.75 |
| 0.35 | 0.4 | 0.15 | 0.2 | 0.05 |

Figure 7

| | | | | |
|---|---|---|---|---|
| 0.25 | 0.75 | 0.5 | 0.75 | 0.25 |
| 0.25 | 0.85 | 0.65 | 0.1 | 0 |
| 0.1 | 0.4 | 0.1 | 0 | 0.1 |
| 0.4 | 0.1 | 0 | 0.25 | 0.75 |
| 0.35 | 0.4 | 0.15 | 0.2 | 0.05 |

| Shipment | Loading time | Delivery time | High CO2 footprint |
|---|---|---|---|
| 1 | 99 | 498 | No |
| 2 | 118 | 485 | No |
| 3 | 101 | 465 | No |
| 4 | 112 | 467 | No |
| 5 | 89 | 508 | No |
| 6 | 77 | 475 | No |
| 7 | 106 | 489 | No |
| 8 | 116 | 506 | No |
| 9 | 76 | 484 | No |
| 10 | 87 | 469 | No |
| 11 | 68 | 493 | No |
| 12 | 108 | 506 | No |
| 13 | 104 | 484 | No |
| 14 | 95 | 470 | No |
| 15 | 76 | 481 | No |
| 16 | 87 | 463 | No |
| ***17*** | ***15*** | ***348*** | ***Yes*** |
| 18 | ... | ... | No |
| ... | ... | ... | No |
| ***48*** | ***...*** | ***...*** | ***Yes*** |
| 49 | ... | ... | No |
| ... | ... | ... | No |
| ***93*** | ***...*** | ***...*** | ***Yes*** |
| ... | ... | ... | ... |

→

Data preprocessing:
LT>100 → 0.3
80≤ LT ≤ 100 → 0.1
LT<80 → 0;
DT>500 → 0.75
470≤ DT ≤ 500 → 0.25
DT<470 → 0;
F1(DT)+F2(LT)

↓

| | | | |
|---|---|---|---|
| 0.35 | 0.55 | 0.3 | 0.3 |
| 0.85 | 0.25 | 0.55 | 1.05 |
| 0.25 | 0.1 | 0.25 | 1.05 |
| 0.55 | 0.35 | 0.25 | 0.1 |

Figure 9

DATA ENCODING USING IMAGES AND MACHINE LEARNING MODELS

CROSS-REFERENCE TO RELATED APPLICATIONS

The present application claims priority to and the benefit of EP Application no.: 24178534.4; filed 28 May 2024, the contents of which are incorporated herein for all purposes.

The technical field of the present application is data analysis and data transmission, in particular in a system comprising various computing devices.

According to a first aspect, a computer-implemented method is provided. The method comprises:

- obtaining, by a first computing device, a plurality of first data values;
- creating, by the first computing device, a first image comprising a plurality of first pixels, wherein the number of first pixels is equal to the number of first data values and wherein each first data value of the plurality of first data values is assigned to a respective first pixel of the plurality of first pixels;
- providing the first image as input to an image-classification machine learning model to obtain a first numerical output value;
- obtaining, by a second computing device, a plurality of second data values;
- creating, by the second computing device, a second image comprising a plurality of second pixels, wherein the number of second pixels is equal to the number of second data values and wherein each second data value of the plurality of second data values is assigned to a respective second pixel of the plurality of second pixels;
- providing the second image as input to the image-classification machine learning model to obtain a second numerical output value;
- evaluating the first numerical output value and the second numerical output value to determine whether the plurality of first data values is consistent with the plurality of second data values.

According to the present disclosure, a computing device may comprise at least one processor. It may further comprise at least one memory or be in communication with at least one memory. A computing device may also comprise one or more input/output units.

In the present disclosure, “obtaining a plurality of (first/second) data values” may comprise retrieving the data e.g. from the at least one memory of the computing device that carries out the step of obtaining the data, from the memory of another computing device, or from another remote data storage (a database, a secondary memory, a cloud storage or the like). Alternatively, “obtaining a plurality of (first/second) data values” may comprise generating the data, e.g. creating the data based on one or more inputs, e.g. retrieved raw data. In yet another example, “obtaining a plurality of (first/second) data values” may comprise retrieving a first portion of the data and generating a second portion of the data, e.g. from the first portion of the data.

The first computing device obtains a plurality of first data values. The first data values may be numerical values, such as integers or floating-point numbers. For instance, the first data values may be values from one or more columns in a relational table. Exemplarily, the first computing device may be configured to obtain a predetermined or predeterminable number of first data values. If the first data values are part of a data set that contains more values than the predetermined or predeterminable number, the first computing device may select the plurality of first data values using one or more criteria, e.g. based on metadata of the first data values or, in the case of a relational table, based on primary keys, foreign keys or other values in the table.

The first computing device creates a first digital image comprising a plurality of first pixels, which are arranged in a grid. The number of first pixels is equal to the number of first data values, so that there is one first pixel for each first data value and there is one first data value for each first pixel. The first image is created by assigning each first data value of the plurality of first data values to a respective first pixel of the plurality of first pixels. In other words, there is a one-to-one correspondence between the set of the first data values and the set of the first pixels. The order in which the values are assigned to the grid comprising rows and columns of pixels may be row-major, column-major or any other order, such as Z-order.

The first computing device converts the plurality of first data values into an image, the first image. The first image may further comprise additional data useful for interpreting the first data values as pixel values, e.g. header data, trailer data and/or other metadata.

The plurality of first data values may originally be stored in a source file having a source data format, such as a proprietary database format, and then they are stored as pixel values in a target file having an image data format. Exemplarily, the first computing device may create the first image by generating a raster file (e.g. in one of the following formats: JPEG, PNG, GIF, TIFF, HEIC) which stores the plurality of first values together with the metadata specific to the raster file format.

Accordingly, the first image may be formally an image, which may e.g. be rendered on a display, for instance in grayscale. However, the first image may not be a depiction of any entity, such as a real or imagined object or living being. In other words, the first image may not provide a visual representation of any entity; the pixel values do not represent visual features of such an entity.

The method further comprises providing the first image as input to an image-classification machine learning model to obtain a first numerical output value. Said otherwise, the method further comprises applying an image-classification machine learning model to the first image as input, wherein the image-classification machine learning model provides as a result an output value, the first numerical output value.

A machine learning model (MLM) is a mathematical model for performing a task, which is not explicitly programmed to perform its task. Rather, an MLM automatically learns and improves from data during the training process. An MLM includes parameters whose values are determined during the training process. Instead, hyper-parameters are settings for the architecture and the learning process of an MLM, which are usually determined before training.

An image-classification MLM performs the task of image classification. It takes an image as input and produces at least one numerical value as output, on the basis of which a class can be assigned to the input image. For example, the image-classification MLM may classify the input image as belonging to one of ten classes, one class for each digit from ‘0’ to ‘9’.

In particular, the image-classification MLM may take the values assigned to the pixels of an input image as input values. Thus, providing the first image as input to the image-classification MLM may comprise providing the plurality of first data values, as assigned to the plurality of first pixels, as input to the image-classification MLM.

Exemplarily, the image-classification MLM may be configured to take a given number of input values. In some cases, the predetermined or predeterminable number of first data values that the first computing device may be configured to obtain may correspond to the given number of input values that the image-classification MLM can take. Accordingly, the first computing device may create the first image having pixel dimensions such that it is suitable to serve as input to the image-classification MLM. Alternatively, the image-classification MLM may be chosen among a plurality of image-classification MLMs on the basis of the number of first pixels, i.e. the number of first data values. In particular, the chosen image-classification MLM may be configured to take a number of input values equal to the number of first data values. In some cases, besides the number of pixels per se, the choice of the image-classification MLM may also be based on the grid dimensions, namely on how the pixels are arranged (e.g., for a total number of 24 pixels, the grid dimensions may be 4×6 or 3×8).

The image-classification MLM may provide one or more numerical output values. For instance, an image-classification MLM with one output value may be used for binary classification, e.g. if the output value is lower than 0.5 the input image is assigned to class X and if it is equal to or greater than 0.5 the input image is assigned to class Y. In the case of a plurality of numerical output values, each output value may be associated to a corresponding class and the input image may be assigned to the class with the highest output value.

If there is just one numerical output value, this is the first numerical output value that is associated by the image-classification MLM to the first image. If there are more numerical output values from the image-classification MLM, the first numerical output value may be selected according to different criteria. In one instance, the first numerical output value may be the highest numerical output value. In another instance, the first numerical output value may be randomly chosen. In yet another instance, the first numerical output value may consistently be the i-th numerical output value, with 1≤ism and m the number of output values, i.e. the output value associated with a specific class. The selection may be determined by a user or automatically by a computing device.

The image-classification MLM may be, in particular, a (previously) trained MLM. In other words, the training of the image-classification MLM may not be part of the method, i.e. the method may not comprise training the image-classification MLM. For instance, the image-classification MLM may be retrieved from any data storage, e.g. it may be downloaded from an online repository.

The training dataset that was used for the image-classification MLM may not comprise images of the same type as the first image, i.e. derived from a plurality of data values. In particular, the already-trained image-classification MLM may have been trained using a training dataset comprising (or consisting of) images containing at least one entity to be classified. As mentioned above, the first image may not represent any entity. Accordingly, the image-classification MLM may be configured to classify images representing at least one entity but may be employed on images that do not contain any entity to be classified. For instance, the image-classification MLM may have been trained on the MNIST dataset of handwritten digits and the first image may not contain any digit (or any other entity).

Examples of image-classification MLMs include, but are not limited to, artificial neural networks (ANNs), decision trees, support vector machines (SVMs), random forests, and gradient boosting machines (GBMs), among others.

ANNs belong to the common knowledge of the skilled person, nevertheless a short overview will be given in the following. Generally, an ANN comprises a plurality of artificial neurons, wherein each neuron is a propagation function that receives one or more inputs and combines them to produce an output, wherein the inputs have different weights. For example, the propagation function may be a sigmoid, so that, for inputs $x_1, x_2, \ldots, x_n$ having respective weights $w_1, w_2, \ldots, w_n$, the output of a neuron is $$\frac{1}{1+\exp\left(-\sum_{i=1}^{n} w_i x_i\right)}.$$

Optionally, the propagation function may include a bias term in the exponent of the exponential function.

The neurons in the ANN are organized in layers and the ANN comprises at least an input layer that receives a plurality of (initial) input values as external data and an output layer that generates one or more (final) output values. Optional layers between the input layer and output layer are called hidden layers, and the neurons in the hidden layers receive inputs from other neurons and provide the output to one or more other neurons. The ANN may have, at least initially, predetermined weights and biases. In the context of machine learning, the effect of training the ANN is an adjustment of the weights and, optionally, of the biases of the propagation functions of the single neurons.

In a particular example, the image-classification MLM may be an ANN. More particularly, the image-classification MLM may be a convolutional neural network.

The method further comprises:

- obtaining, by a second computing device, a plurality of second data values;
- creating, by the second computing device, a second image comprising a plurality of second pixels, wherein the number of second pixels is equal to the number of second data values and wherein each second data value of the plurality of second data values is assigned to a respective second pixel of the plurality of second pixels;
- providing the second image as input to the image-classification machine learning model to obtain a second numerical output value.

The second computing device is a separate computing device from the first computing device. For instance, the first computing device and the second computing device may belong, respectively, to a first organization and a second organization.

The second computing device obtains the plurality of second data values and creates the second image in the same way as the first computing device obtains the plurality of first data values and creates the first image. Accordingly, the description above relative to the steps of obtaining the first data values and creating the second image applies analogously to the respective steps carried out by the second data values.

Exemplarily, the first data values and the second data values may be values of a physical parameter measured by respective measuring devices, e.g. sensors.

Similarly, the description relative to providing the first image to the image-classification MLM applies analogously to providing the second image as input to the image-classification machine learning model to obtain a second numerical output value. It is noted that the same image-classification MLM is evaluated for obtaining the first numerical output value and the second numerical output value. Accordingly, the number of first data values may be the same as the number of second data values, and the number of first pixels may be the same as the number of second pixels. As mentioned above, the image-classification machine learning model may be configured to classify images containing at least one entity to be classified; and the first image and the second image may not contain any entity to be classified.

If the image-classification MLM provides a plurality of numerical output values, e.g. one for each class, the first numerical output value and the second numerical output value are consistently chosen. Considering the ordered set of output values provided for the first image, $A_1 \ldots A_N$, and the ordered set of output values provided for the second image, $B_1 \ldots B_N$, the first and second numerical output values have the same rank i.e. are $A_j$ and $B_j$, e.g. they correspond to the same class. In particular, in examples in which one (the first or the second) numerical output value is chosen to be the highest among the plurality of numerical output values output by the image-classification MLM, the other (the second or the first, respectively) numerical output value is chosen to have the same rank, and it may not be the highest of its set of output values. In these cases, the rank of the first/second numerical output value may be communicated between different computing devices.

The method comprises a first sequence of steps, namely:

- obtaining, by the first computing device, the plurality of first data values;
- creating, by the first computing device, the first image comprising the plurality of first pixels;
- providing the first image as input to an image-classification machine learning model to obtain the first numerical output value;

as well as a second sequence of steps, namely:

- obtaining, by the second computing device, the plurality of second data values;
- creating, by the second computing device, the second image comprising the plurality of second pixels;
- providing the second image as input to the image-classification machine learning model to obtain the second numerical output value.

The first sequence of steps and the second sequence of steps may be performed at least partly in parallel. In this case, during the same time interval, one step from the first sequence as well as one step from the second sequence may be at least partially performed. Alternatively, they may be performed one after the other (the first sequence after the second sequence or the second sequence after the first sequence), meaning that the first step of one sequence begins after the last step of the other sequence.

In examples in which the image-classification MLM is chosen based on the number of first/second pixels, the second/first sequence of steps may be performed at least after selection of the MLM, so that the number of second/first data values may be accordingly determined.

In examples in which the first/second numerical output value is chosen to be the highest among a plurality of numerical output values output by the image-classification MLM, the step of providing the second/first image to the image-classification MLM may be carried out after first/second numerical output value is chosen, so as to have a consistent rank, as explained above.

The method further comprises evaluating the first numerical output value and the second numerical output value to determine whether the plurality of first data values is consistent with the plurality of second data values. The consistency between the plurality of first data values and the plurality of second data values may be a measure of similarity therebetween. Thus, the plurality of first data values may be determined to be consistent with the plurality of second data values if the differences therebetween are within certain limits.

Specifically, consistency is assessed using the first and second numerical output values, in particular it may be based on their relation. Thus, evaluating the first numerical output value and the second numerical output value may comprise performing an operation and/or evaluating a function that measures the two numerical output value against each other. Exemplarily, the consistency between the plurality of first data values and the plurality of second data values may be determined based on the similarity between the first numerical output value and the second numerical output value.

Exemplarily, the method may comprise r sequences of the steps above (obtaining data values, creating the image and providing the image to the image-classification MLM) for respective r different computing devices, and the method may comprise r−1 evaluations of pairs of numerical output values, e.g. each p-th numerical output value (with $1<p\leq r$) may be evaluated against the first numerical output value.

The method described herein allows for the comparison of private data sets while, at the same time, preserving the confidentiality of the underlying data. Indeed, the method involves encoding a plurality of data values into a single numerical output value by treating them as an image that can be fed to an image-classification MLM. It is not possible to recover the data values from the numerical output value, which means that the numerical output value can be safely shared without a risk of revealing the underlying data values. At the same time, the numerical output value is still representative of the plurality of data values (in virtue of the transformation via the image and the image-classification MLM) in such a way that it can be used to determine a degree of similarity between two sets of data values. Accordingly, multiple parties can securely collaborate on analyzing data without sharing the actual raw data, protecting the privacy of sensitive information.

In a particular example, evaluating the first numerical output value and the second numerical output value may comprise computing a difference between the first numerical output value and the second numerical output value; and the plurality of first data values may be consistent with the plurality of second data values when the difference between the first numerical output value and the second numerical output value is below a predetermined threshold.

Exemplarily, the difference may be obtained by subtracting one from the other, and, optionally, taking the absolute value thereof, i.e. it may be an absolute difference. Alternatively, the difference may be obtained by taking a ratio of the first and second numerical output values. Other metrics may be used, such as relative change.

The predetermined threshold may be set by a user or by a computing device. In one example, multiple pairs of data sets that are established to be consistent may be encoded and the pairwise differences between their numerical output values may be computed, obtaining a set of consistency-indicating differences. Similarly, multiple pairs of data sets that are established to be inconsistent may be encoded and the pairwise differences between their numerical output values may be computed, obtaining a set of inconsistency-indicating differences. The predetermined threshold may be a value that is higher than each element in the set of consistency-indicating differences and lower than each element in the set of inconsistency-indicating differences. For instance, the predetermined threshold may be the mean between the maximum in the set of consistency-indicating differences and the minimum in the set of inconsistency-indicating differences.

The predetermined threshold may be different depending on the first and second data values to which the method is applied.

For instance, if the image-classification MLM is configured to output numerical values that are comprised between 0 and 1, the predetermined threshold may be 0.05, or more particularly 0.03, or even more particularly 0.01.

In a particular example, obtaining, by the first computing device, the plurality of first data values may comprise retrieving a first data set including a plurality of first raw values and deriving the plurality of first data values from the plurality of first raw values by applying one or more data preprocessing techniques; and obtaining, by the second computing device, the plurality of second data values may comprise retrieving a second data set including a plurality of second raw values and deriving the plurality of second data values from the plurality of second raw values by applying one or more data preprocessing techniques. A preprocessing technique may be any technique that transforms the raw data, e.g. that maps each raw value to a (final) data value, such as by using one or more rules and/or functions.

One preprocessing technique may be data conversion. For instance, if the raw data comprise non-numerical values, such as strings, the non-numerical values may be transformed into numeric values. Another preprocessing technique may be data binning. The raw data are divided into a plurality of intervals or bins, and the raw data values falling into a given interval are replaced by a value representative of that interval. Yet another preprocessing technique may be data scaling. The raw data are scaled to be within a certain range and/or to have a certain distribution. For instance, normalization may transform the raw data to have values between 0 and 1, while min-max scaling may transform the data to have a specific minimum and maximum value. Yet a further preprocessing technique may comprise quantization. The raw data may be floating point values and they may be transformed into integers via the quantization, e.g. an 8-bit quantization. One or more of these or other preprocessing techniques not listed above may be applied to the first raw values and the second raw values.

The steps of providing the first image as input to the image-classification MLM, of providing the second image as input to the image-classification MLM, and of evaluating the first numerical output value and the second numerical output value may be carried out by various computing devices.

In a particular example, the first image may be provided to the image-classification machine learning model by the first computing device and the second image may be provided to the image-classification machine learning model by the second computing device. In this example, the method may further comprise sending, by the first computing device, the first numerical output value to the second computing device, and/or sending, by the second computing device, the second numerical output value to the first computing device; and the first numerical output value and the second numerical output value may be evaluated by the first computing device and/or by the second computing device.

For instance, the first computing device may send the first numerical output value to the second computing device and the second computing device may evaluate the received first numerical output value and the second numerical output value that it previously obtained by evaluating the image-classification MLM. In another instance, the second computing device may send the second numerical output value to the first computing device and the first computing device may evaluate the received second numerical output value and the first numerical output value that it previously obtained by evaluating the image-classification MLM. In these instances, data transmission may be minimized, increasing efficiency.

In yet another instance, the first computing device and the second computing device may exchange the first numerical output value and the second numerical output value. In this case, the evaluation may be carried out by both computing devices. In this instance, each computing device determines the consistency independently, which may allow for a cross-check or may allow for more flexibility, e.g. each computing device may apply its own criteria in the evaluation, such as its own predetermined threshold.

In another particular example, the first image may be provided to the image-classification machine learning model by the first computing device, the second image may be provided to the image-classification machine learning model by the second computing device; and the method may further comprise sending, by the first computing device, the first numerical output value to a third computing device, and sending, by the second computing device, the second numerical output value to the third computing device; and the first numerical output value and the second numerical output value may be evaluated by the third computing device.

In this example, there may be no direct communication between the first computing device and the second computing device, further increasing safety, since any information relative to the first computing devices, e.g. the party to which it belongs, may not be disclosed to the second computing device and vice versa, preserving privacy. If a communication about the rank of the output value is carried out, it may be done via the third computing device.

In one instance of this example, the result of the evaluation, namely the determination of whether the first data values and the second data values are consistent, may be kept at the third computing device. In another instance, the method may further comprise, communicating, by the third computing device, the determination of whether the plurality of first data values is consistent with the plurality of second data values to the first computing device and/or the second computing device. In some cases, the third computing device may only communicate the determination if it is negative, i.e. if there is no consistency.

Accordingly, safety may be increased by preserving the confidentiality of possibly sensitive or private information (the result of the evaluation), which may be kept at the third computing device or shared with only one of the first and second computing devices. The latter may be the case, for example, if one of the two sets of data values is a reference and it is desired to determine whether the other set deviates from the reference or not: the result of the assessment may be meant only for the party associated with the other set.

In another particular example, the method may further comprise sending, by the first computing device, the first image to a third computing device; and sending, by the second computing device, the second image to a third computing device. In this case, the first image may be provided to the image-classification machine learning model by the third computing device; the second image may be provided to the image-classification machine learning model by the third computing device; and the first numerical output value and the second numerical output value may be evaluated by the third computing device.

In one instance of this example, the result of the evaluation, namely the determination of whether the first data values and the second data values are consistent, may be kept at the third computing device. In another instance, the method may further comprise, communicating, by the third computing device, the determination of whether the plurality of first data values is consistent with the plurality of second data values to the first computing device and/or the second computing device. In some cases, the third computing device may only communicate the determination if it is negative, i.e. if there is no consistency.

This example may have the same advantages as the previous example. Furthermore, the image-classification MLM may be only employed by the third computing device, ensuring that both the set of first data values and the set of second data values are consistently encoded.

In another particular example, the method may further comprise: sending, by the first computing device, the first image to a third computing device, wherein the first image may be provided to the image-classification machine learning model by the third computing device; sending, by the second computing device, the second image to a fourth computing device, wherein the second image may be provided to the image-classification machine learning model by the fourth computing device; sending, by the third computing device, the first numerical output value to a fifth computing device; and sending, by the fourth computing device, the second numerical output value to the fifth computing device; wherein the first numerical output value and the second numerical output value may be evaluated by the fifth computing device.

In one instance of this example, the result of the evaluation, namely the determination of whether the first data values and the second data values are consistent, may be kept at the fifth computing device. In another instance, the method may further comprise, communicating, by the fifth computing device, the determination of whether the plurality of first data values is consistent with the plurality of second data values to the third computing device and/or the fourth computing device, and either communicating, by the third computing device, the determination to the first computing device or communicating, by the fourth computing device, the determination to the second computing device or both communicating, by the third computing device, the determination to the first computing device and communicating, by the fourth computing device, the determination to the second computing device. In some cases, the fifth computing device may only communicate the determination if it is negative, i.e. if there is no consistency.

In this example, there may be no communication between the first computing device and the second computing device, further increasing safety. Furthermore, a degree of separation is introduced between the devices from which the data values come (the first and second computing devices) and the device determining whether there is consistency between the data values (the fifth computing device) to further increase safety by preserving privacy.

Exemplarily, the fifth computing device may be part of a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud computing environment (or cloud) may have one or more of the following characteristics: scalability, multitenancy, performance monitoring, virtual resources that are dynamically assignable to different users according to demand, multiple redundant sites, multiple virtual machines, as well as network accessibility (e.g., via. the Internet) from multiple locations (e.g., via a web browser) and devices (e.g., mobile device or PC). Exemplarily, the third and fourth computing devices may be fog nodes.

The method according to the first aspect may be implemented as a computing system comprising at least a first computing device and a second computing device, wherein the first computing device is configured to:

- obtain a plurality of first data values;
- create a first image comprising a plurality of first pixels, wherein the number of first pixels is equal to the number of first data values and wherein each first data value of the plurality of first data values is assigned to a respective first pixel of the plurality of first pixels;

wherein the second computing device is configured to:

- obtain a plurality of second data values;
- create a second image comprising a plurality of second pixels, wherein the number of second pixels is equal to the number of second data values and wherein each second data value of the plurality of second data values is assigned to a respective second pixel of the plurality of second pixels; and wherein the computing system is further configured to:

- provide the first image as input to an image-classification machine learning model to obtain a first numerical output value;
- provide the second image as input to the image-classification machine learning model to obtain a second numerical output value;
- evaluate the first numerical output value and the second numerical output value to determine whether the plurality of first data values is consistent with the plurality of second data values.

The steps of providing the first image to the image-classification MLM, providing the second image to the image-classification MLM and evaluating the first and second numerical output values may be performed by any combination of computing devices as discussed above.

For instance, in one of the examples discussed above, the system may comprise a third computing device, a fourth computing device and a fifth computing device, wherein:

- the first computing device may be further configured to send the first image to the third computing device;
- the second computing device may be further configured to send the second image to the fourth computing device;
- the third computing device may be configured to provide the first image to the image-classification machine learning model and to send the first numerical output value to the fifth computing device;
- the fourth computing device may be configured to provide the second image to the image-classification machine learning model and to send the second numerical output value to the fifth computing device; and
- the fifth computing device may be configured to evaluate the first numerical output value and the second numerical output value.

A second aspect relates to a computer-implemented method comprising:

obtaining a plurality of data values;

creating a plurality of data sets, each data set comprising the same number of data values from the plurality of data values;

creating a plurality of images, wherein:

the number of images is equal to the number of sets, each image of the plurality of images comprises a plurality of pixels, the number of pixels is equal to the number of data values in each set, and for each pair comprising a set and a respective image, each data value of the set is assigned to a respective pixel of the respective image;

training a machine learning model using the plurality of images as training data, wherein an architecture of the machine learning model is configured for image classification.

As already described above, obtaining the plurality of data values may comprise retrieving and/or generating the data values. The plurality of data values is subdivided into a plurality of data sets, all having the same cardinality. A data value may be part of more than one data set.

In some examples, obtaining the plurality of data values and creating the data sets may be a single step, e.g. the method may comprise obtaining the plurality of data sets.

The choice of how to split the plurality of data values may be based on one or more criteria, e.g. based on any one or combination of the following: metadata (e.g. timestamps) of the data values, input by a user, conditions on the data values and/or their attributes, and, in the case of a relational table, primary keys, foreign keys or other values in the table.

A plurality of images is created, one image for each data set, in the same way as the first and second images are created as described for the first aspect: for a given data set, the data values therein are assigned to pixels in an image in a one-to-one correspondence. The details and examples described for creating the first image in the first aspect apply mutatis mutandis to creating each one of the plurality of images in the second aspect. In particular, no image of the plurality of images may depict an entity.

The plurality of images is used for training a machine learning model. Accordingly, the MLM of the second aspect is different from the MLM of the first aspect, which was already trained.

The parameters of the MLM (e.g. the weights in the case of an ANN) may be randomly initialized and their final values are determined by the training process. Instead, the architecture of the MLM is already established, which means that at least some (in some cases all) of the hyper-parameters may be fixed. Specifically, the architecture of the MLM is designed for image classification, i.e. the architecture is adapted for the task of image classification. Exemplarily, the MLM may be a CNN.

The MLM is configured to have one or more outputs, e.g. one or more output nodes. In order to serve as training data, each image may be associated with a respective set of output values, each set comprising one or more output values. In other words, the training data may comprise pairs, each pair including an image and a set of output values. The number of output values in each set is determined by the number of outputs given by the MLM.

The set of output values may be determined based on the data set corresponding to the image. Exemplarily, one or more rules may be set to associate a set of output values to a data set. In this case, the MLM may be trained so that it "learns" these criteria.

The MLM is trained so that it becomes capable of outputting one or more output values pertinent to the respective input data set. The output values do not provide a classification of the image, even if the MLM has an image-classification architecture.

For instance, the output value(s) may provide a prediction and/or a detection about a system to which the data set relates. In some cases, the one or more output values may directly provide the detection and/or prediction, e.g. if the detection and/or prediction consists in a numerical value and there is only one output node. In other cases, the one or more output values per se may not provide the detection and/or prediction about the system, and may rather be interpreted on the basis of one or more predetermined criteria, which may be specific to the MLM. Given the criteria, the output values are what determines the detection and/or prediction. The output value(s) may also be thought of as a "raw result" that needs to be construed into the desired information about the system.

The MLM is trained to output values relevant to the input data set, rather than providing image classifications. Accordingly, curated training data and loss functions or optimization strategies tailored to generate meaningful output values related to the analyzed system may be employed.

According to this second aspect, data values are converted into images and an MLM with an architecture specific to image classification is trained to provide one or more output values which do not identify any image class but rather provide information derived from the data values, e.g. about a system to which the data values relate. Training an MLM with image-classification architecture on the image conversions of the data values is more efficient and leads to a more accurate MLM than training a generic MLM directly on the data values. In addition, image-based representations capture complex patterns and relationships (e.g., applying CNNs), and may allow to take advantage of pre-trained models and transfer learning for improved performance in generating relevant output values.

In a particular example, obtaining the plurality of data values may comprise retrieving a plurality of raw values and deriving the plurality of data values from the plurality of raw values by applying one or more data preprocessing techniques, such as those discussed for the first aspect. Alternatively, the one or more data preprocessing techniques may be applied after creating the data sets.

In a particular example, the plurality of data values may be values of a physical parameter measured by a measuring device (e.g. a sensor) and the machine learning model may provide a detection and/or a prediction about a state of a physical system described by the physical parameter.

The physical system may be anything for which machine learning can be employed. Exemplarily, the physical system may comprise a physical object, such as a battery or a wheel, or a plurality of physical objects, such as a group of vehicles or a group of manufacturing machines. The physical system may be generally characterized by one or more possible features and the MLM may provide an assessment based on and/or concerning the one or more features. This assessment may refer to the present state of the physical system and, thus, entail some sort of detection (e.g. mechanical wear evaluation). Alternatively or additionally the assessment may refer to a future state of the physical system and, thus, constitute a prediction (e.g. forecasting battery duration or prognosticating failure of a component).

In some cases, the plurality of data values may be values of more than one physical parameter, which may be measured by one or more measuring devices. For instance, the plurality of data values may comprise a group of physical parameters recorded at multiple times and each data set may comprise the group of physical parameters recorded at a given time.

In a further particular example, the physical parameter may be acceleration of a vehicle, and the machine learning model may provide the detection and/or prediction of a traffic jam and/or a traffic accident. The physical system in this case may be a set of vehicles on a road. The plurality of data values may refer to a plurality of respective road sections and each road section may be associated to the acceleration of a vehicle currently in that road section, wherein the acceleration can take both positive and negative values (deceleration). If there is no vehicle in a road section, the respective "acceleration" value may be the NULL value. Taking the acceleration values as input, the MLM may detect or predict whether a traffic jam and/or a traffic accident is occurring or will occur. Thus, road safety may be improved.

Any of the disclosed methods can be implemented in the form of one or more computer programs (e.g. computer program products), wherein the computer program products may cause one or more data processing apparatuses to perform one or more operations described in the present disclosure.

The subject matter described in the present disclosure can be implemented in a data signal or on a machine readable medium, where the medium is embodied in one or more information carriers, such as an optical storage device (e.g., CD-ROM, DVD-ROM), magnetic tape, a semiconductor memory, or a hard disk. In particular, disclosed subject matter may be tangibly embodied in a non-transitory machine (computer) readable medium, such that signals and carrier waves are excluded.

BRIEF DESCRIPTION OF THE FIGURES

Details of exemplary embodiments are set forth below with reference to the exemplary drawings. Other features will be apparent from the description, the drawings, and from the claims.

FIGS. 3 to 5 show examples of pixel grids created from data values.

FIG. 7 shows an example of a pixel grid created from data values that are preprocessed.

FIG. 9 shows another example of a pixel grid created from data values that are preprocessed.

DETAILED DESCRIPTION OF THE FIGURES

In the following, a detailed description of examples will be given with reference to the drawings. Various modifications to the examples may be made. Unless explicitly indicated otherwise, elements of one example may be combined and used in other examples to form new examples.

Figure 1:
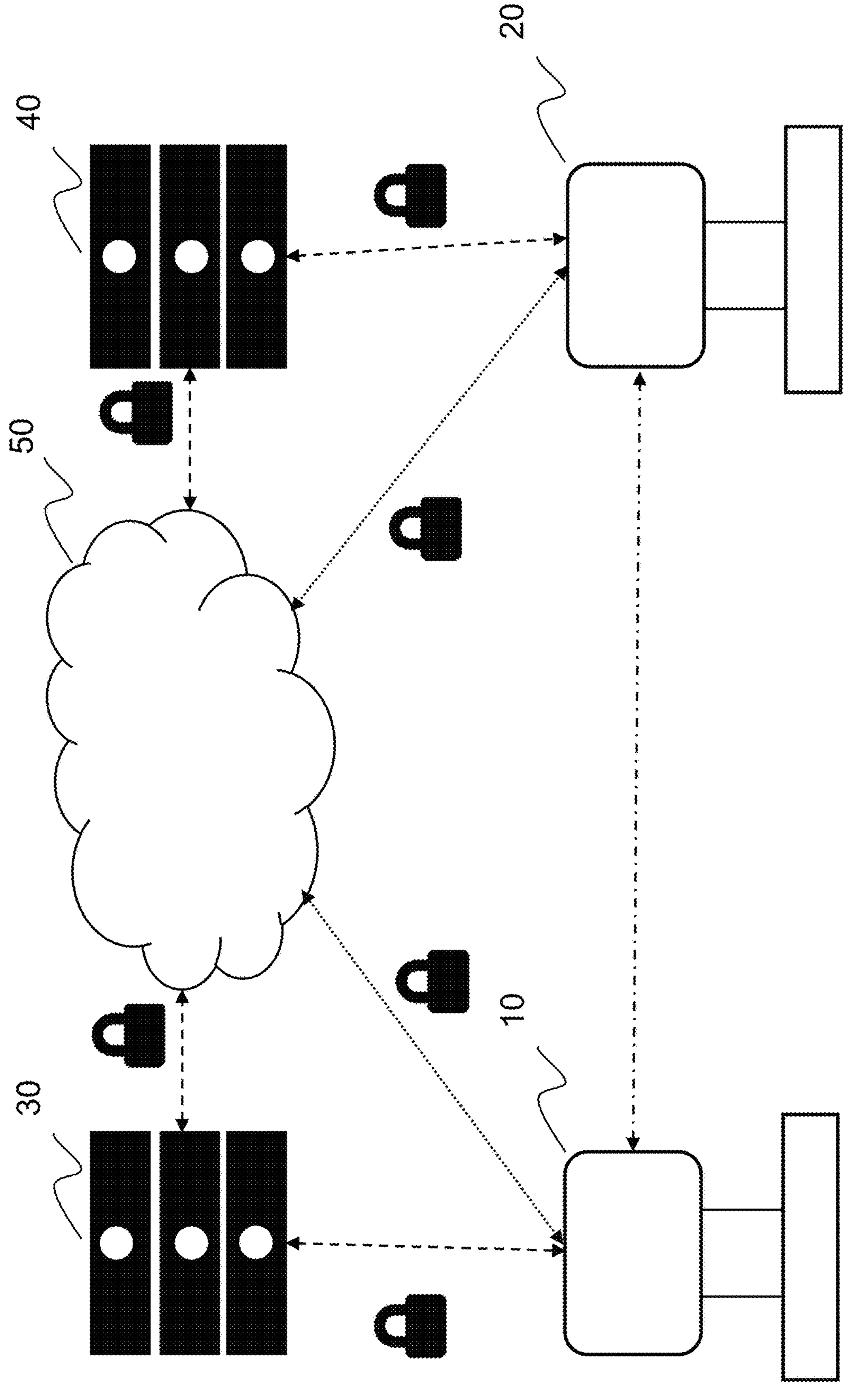
FIG. 1 shows a schematic representation of components of an exemplary computing system.

FIG. 1 shows a schematic representation of components of an exemplary computing system 100. The computing system 100 comprises at least a first computing device 10 and a second computing device 20. Optionally, the computing system 100 may further comprise a third computing device 30, a fourth computing device 40 and a fifth computing device 50 or, alternatively, only the fifth computing device 50. The computing system 100 may also comprise additional computing devices not shown in FIG. 1.

The components of the system 100 can be interconnected by any form or medium of digital data communication, e.g., a communication network. Examples of communication networks include a local area network ("LAN") and a wide area network ("WAN"), e.g., the Internet. In a first example, the system 100 comprises only the first and second computing devices 10, 20 and the first computing device 10 and the second computing device 20 are in communication with each other (dot-dashed line). In a second example, the system comprises only the first, second and fifth computing devices 10, 20, 50, the first computing device 10 and the second computing device 20 are not in direct communication with each other but each of them is in communication with the fifth computing device 50 (dotted lines). In a third example, the first computing device 10 and the second computing device 20 are neither in direct communication with each other nor with the fifth computing device 50; the first computing device 10 communicates with the third computing device 30, the second computing device 20 communicates with the fourth computing device 40 and the third and fourth computing devices 30, 40 are not in direct communication with each other but each communicates with the fifth computing device 50 (dashed lines).

Each of the computing devices in system 100 may comprise a processor. Processors suitable for the execution of a computer program include, by way of example, both general and special purpose microprocessors, and any one or more processors of any kind of digital computer. Generally, a processor will receive instructions and data from a read only memory or a random-access memory or both. Generally, a computer will also include, or be operatively coupled to receive data from or transfer data to, or both, one or more mass storage devices for storing data, e.g., magnetic, magneto-optical disks, or optical disks.

In the third example mentioned above, the first and second computing devices 10, 20 may be client computers, the third and fourth computing devices 30, 40 may be fog nodes and the fifth computing device 50 may be a cloud server.

Figure 2:
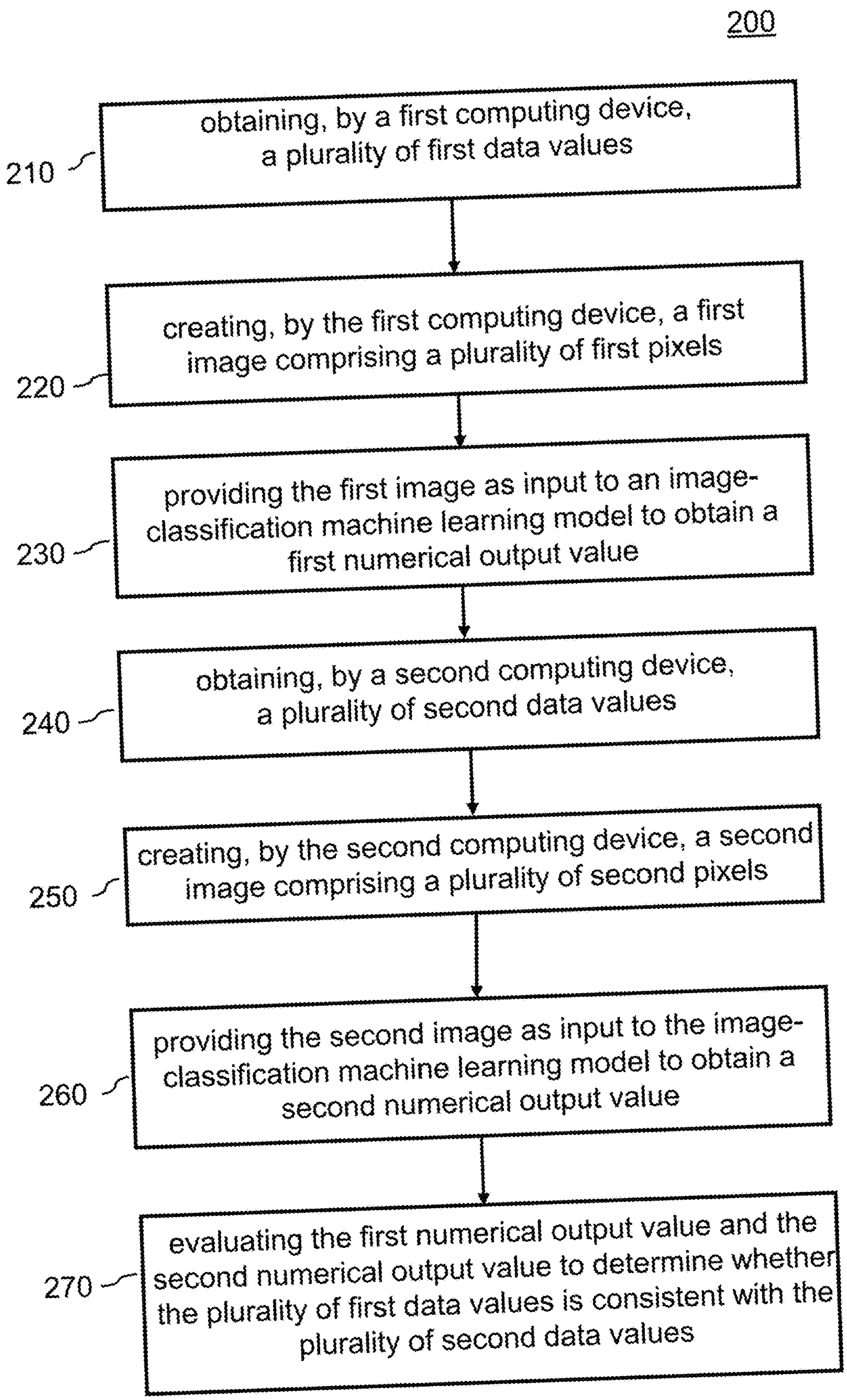
FIG. 2 shows a flow chart of an exemplary method for checking data consistency.

FIG. 2 shows a flow chart of an exemplary method 200 for checking data consistency. The method 200 will be described in the following with reference to the third example of the computing system 100 described above. However, any other configuration of the system 100 is suitable for carrying out the method 200.

At 210 the first computing device 10 obtains a plurality of first data values, e.g. from column B of the table in FIG. 3. At 220 the first computing device 10 creates from the plurality of first data values a first image comprising a first pixel grid in which the pixel values are given by the first data values. For example, the right side of FIG. 3 shows a pixel grid in the first image, also referred to as Image 1, wherein the values for the first pixels are in a one-to-one correspondence with the first data values from column B. The pixel grid of Image 1 has dimensions 5×5 and the data values are assigned in row-major order. Image 1 further comprises metadata such as header data. In the example shown in the figure, the data values from column B are floating point values and they are directly used as pixel values. In another example, not shown, the floating point values from column B may be quantized (e.g. with an 8-bit quantization that maps them to the range [0-255]) and turned into integers as part of data preprocessing, so that Image 1 stores integer values.

Image 1 is sent by the first computing device 10 to the third computing device 30, which, at 230, provides the first image as input to an image-classification MLM and obtains a first numerical output value. For example, the image-classification MLM may be a CNN configured to classify digits (e.g. handwritten digits), which means that the CNN has ten output neurons, each one corresponding to one of the digits 0-9, and, thus, outputs a vector of ten output values. The first numerical output value may be chosen to be the first value in the vector, namely the one corresponding to the digit '0'. For instance, the first numerical output value may be 0.6.

At 240 the second computing device 20 obtains a plurality of second data values, e.g. from column B of the table in FIG. 4. At 250 the second computing device 20 creates from the plurality of second data values a second image comprising a second pixel grid in which the pixel values are given by the second data values. For example, the right side of FIG. 4 shows a pixel grid in the second image, also referred to as Image 2, wherein the values for the second pixels are in a one-to-one correspondence with the second data values from column B. The pixel grid of Image 2 has dimensions 5×5 and the data values are assigned in row-major order. Image 2 further comprises metadata such as header data. In the example shown in the figure, the data values from column B are floating point values and they are directly used as pixel values. In another example, not shown, the floating point values from column B may be quantized (e.g. with an 8-bit quantization that maps them to the range [0-255]) and turned into integers as part of data preprocessing, so that Image 2 stores integer values.

Image 2 is sent by the second computing device 20 to the fourth computing device 40, which, at 260, provides the second image as input to the image-classification MLM and obtains a second numerical output value. The second numerical output value has the same rank in the vector of ten output values output by the CNN for the input Image 2 as the rank of the first numerical output value in the vector of ten output values output by the CNN for the input Image 1. Following the example above, it may be the one corresponding to the digit '0'. For instance, the second numerical output value may be 0.62.

The third computing device 30 sends the first numerical output value '0.60' to the fifth computing device 50 and the fourth computing device sends the second numerical output value '0.62' to the fifth computing device 50. At 270, the fifth computing device 50 evaluates the first and second numerical output values to determine whether the plurality of first data values is consistent with the plurality of second data values. The fifth computing device may compute the absolute difference $|0.6-0.62|=0.02$ and compare it with a predetermined threshold of 0.05. Since the absolute difference between the numerical output values is lower than the threshold, the plurality of first data values may be found to be consistent with the plurality of second data values. Indeed, in this case, only the values in rows 8 and 11 of column B of FIG. 4 are different with respect to the corresponding values in column B of FIG. 3.

In a different scenario, the second computing device 20 may obtain a plurality of third data values from column B in the table of FIG. 5. Alternatively, there may be a sixth computing device (not shown) in the system 100 that obtains the plurality of third data values from column B in the table of FIG. 5. In any case, the values from column B of FIG. 5 are assigned to the pixel grid of image 3 as shown on the right of FIG. 5, similarly to what discussed above for images 1 and 2. Image 3 may be sent by the second computing device 20 to the fourth computing device 40 or by the sixth computing device to a seventh computing device (not shown), wherein Image 3 is fed as input to the CNN. The output value corresponding to digit '0' (which may be referred to as "third numerical output value") may be in this case 0.48. This value is sent to the fifth computing device 50 and evaluated against the first numerical output value. The absolute difference $|0.6-0.48|=0.12$ is greater than the threshold of 0.05, thus, it is determined that the plurality of first data values and the plurality of third data values are not consistent. Indeed, in this case, there are five different values between column B in FIG. 3 and column B in FIG. 5.

The fifth computing device 50 may communicate to the fourth computing device 40 (or the seventh computing device) that there was a discrepancy between the data sets and this may, in turn, be communicated to the second computing device 20 (or the sixth computing device).

Checking whether data are consistent within certain margins may be useful in a variety of fields. One example is supply-chain management, e.g. in manufacturing, which suffers from the bullwhip effect: forecast data across the supply chain may be compared for consistency with one another. Another example is demand and capacity management across different suppliers of a manufacturer, wherein the different suppliers produce the same component: demand data on the side of the manufacturer may be pairwise compared with the supply data on the side of each supplier to identify the supplier that (better) matches the demand of the manufacturer. Yet another example is damage assessment, e.g. of damages caused by transportation: quality data of a manufacturer (e.g. related to a component of an electronic device produced by the manufacturer) may be compared with quality data of a supplier (e.g. of said component, such as a screen). Inconsistency between quality data measured before and after transport may indicate that damage was caused by transportation.

Figure 6:
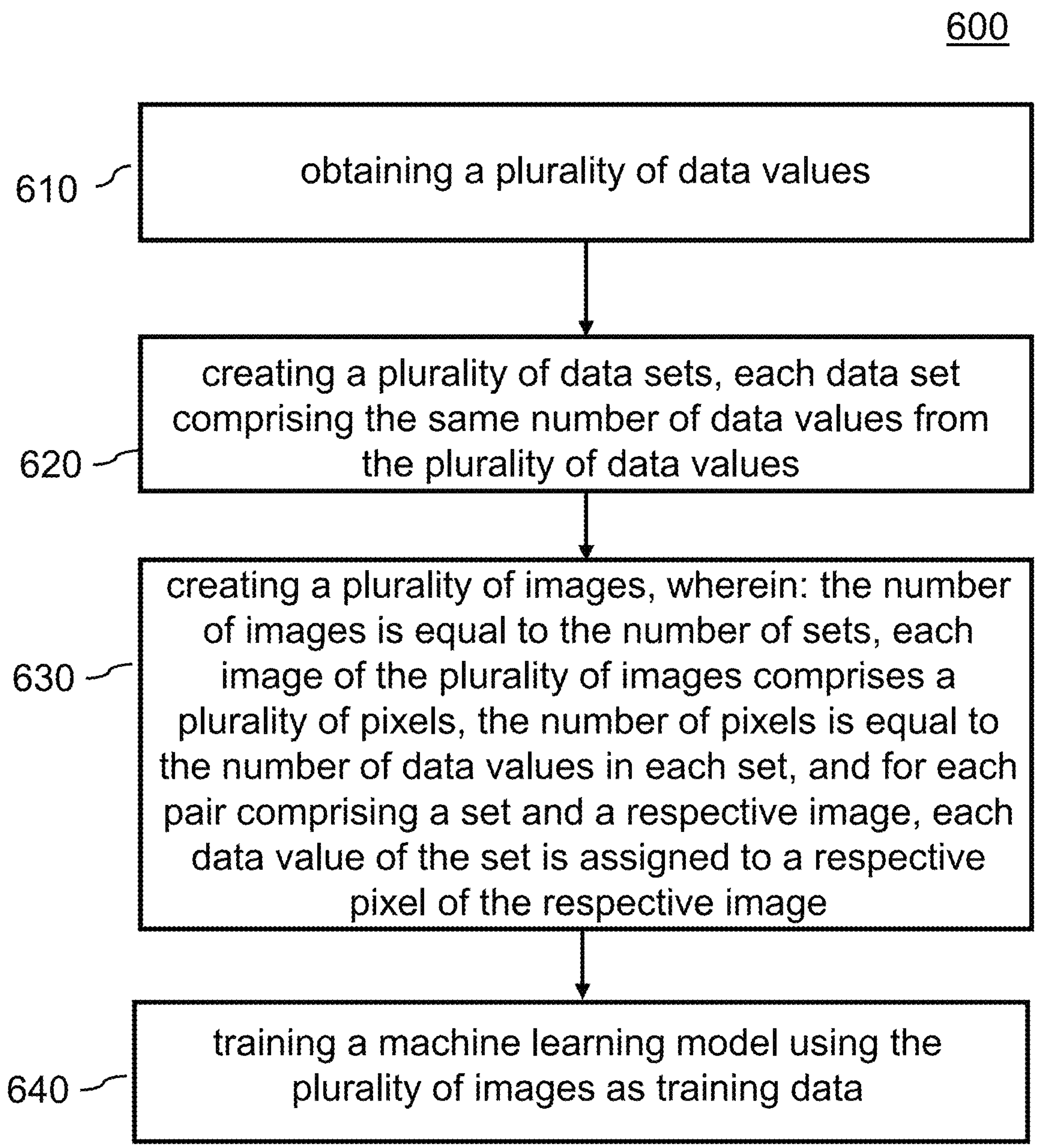
FIG. 6 shows a flow chart of an exemplary method for training a machine learning model.

FIG. 6 shows a flow chart of an exemplary method 600 for training a machine learning model.

The method 600 comprises obtaining, at 610, a plurality of data values, such as from the table of FIG. 7. The table in FIG. 7 contains data relating to a stretch of road with cars travelling on it. The stretch of road is divided into 25 sections (second column), whose size may be chosen so that only one car can be in a given section at a given moment. The third column of the table indicates whether there is a car (value 1) or whether there is no car (value 0) on a given section of the road. The fourth column of the table contains values for the acceleration of the cars, when present, otherwise a NULL value, wherein negative values of the acceleration indicate a deceleration. The acceleration values may be in km/(h·s). The presence of a car and its acceleration may be detected by one or more sensors.

Only the first 26 rows of the table are shown in FIG. 7, however the table may comprise hundreds or thousands of rows. In particular, the data in the table may be taken at different times, as indicated by the timestamps in the first column. Accordingly, data concerning the presence and acceleration of cars on those 25 sections of the road may be detected at different times.

The acceleration values are pre-processed to obtain the plurality of data values. In particular, a mapping function may be applied that assigns 0.75 to each acceleration value lower than −5, 0.4 to each acceleration value between −5 and 5 (endpoints included), 0.2 to each acceleration value greater than 5, and 0 to each acceleration value equal to NULL.

After the mapping function, a proximity function may be applied that adds:

0.25 to each value that is adjacent to a mapped value of 0.75, 0.1 to each value that is adjacent to a mapped value of 0.4, and 0.05 to each value that is adjacent to a mapped value of 0.2.

Two mapped values are adjacent when they are consecutive, meaning that if the mapped values are a set $y_1, \ldots, y_q$, a value $y_k$ is adjacent to a value $y_j$ if $j=k-1$ or $j=k+1$.

In the example shown in the figures, the values obtained after applying the mapping function and the proximity function are the plurality of data values. In another (not shown) example, the preprocessing may further comprise quantization (e.g. with an 8-bit quantization that maps into the range [0-255]), so that values returned by the proximity function are turned into integers, which then constitute the plurality of data values.

The method comprises, at 620, creating a plurality of data sets from the plurality of data values, each data set comprising the same number of data values from the plurality of data values. In the example of FIG. 7, each data set may comprise data values relative to the same time, i.e. having the same timestamp, so that each data set may comprise 25 data values. Accordingly, the plurality of data sets may correspond to the plurality of timestamps in the table. For instance, the first data set may comprise data values obtained from rows 1 to 25 of the table of FIG. 7, which relate to timestamp 1.

At 630, the method comprises creating a plurality of images, one for each data set. For instance, FIG. 7 shows on the right a pixel grid having 25 pixels, i.e. the same number of data values as in a data set, wherein the pixel values are given by the data values in the first data set, in a one-to-one correspondence following a row-major order. The image containing this pixel grid is, thus, created from the first data set. Other similar images are created from the other data sets.

Figure 8:
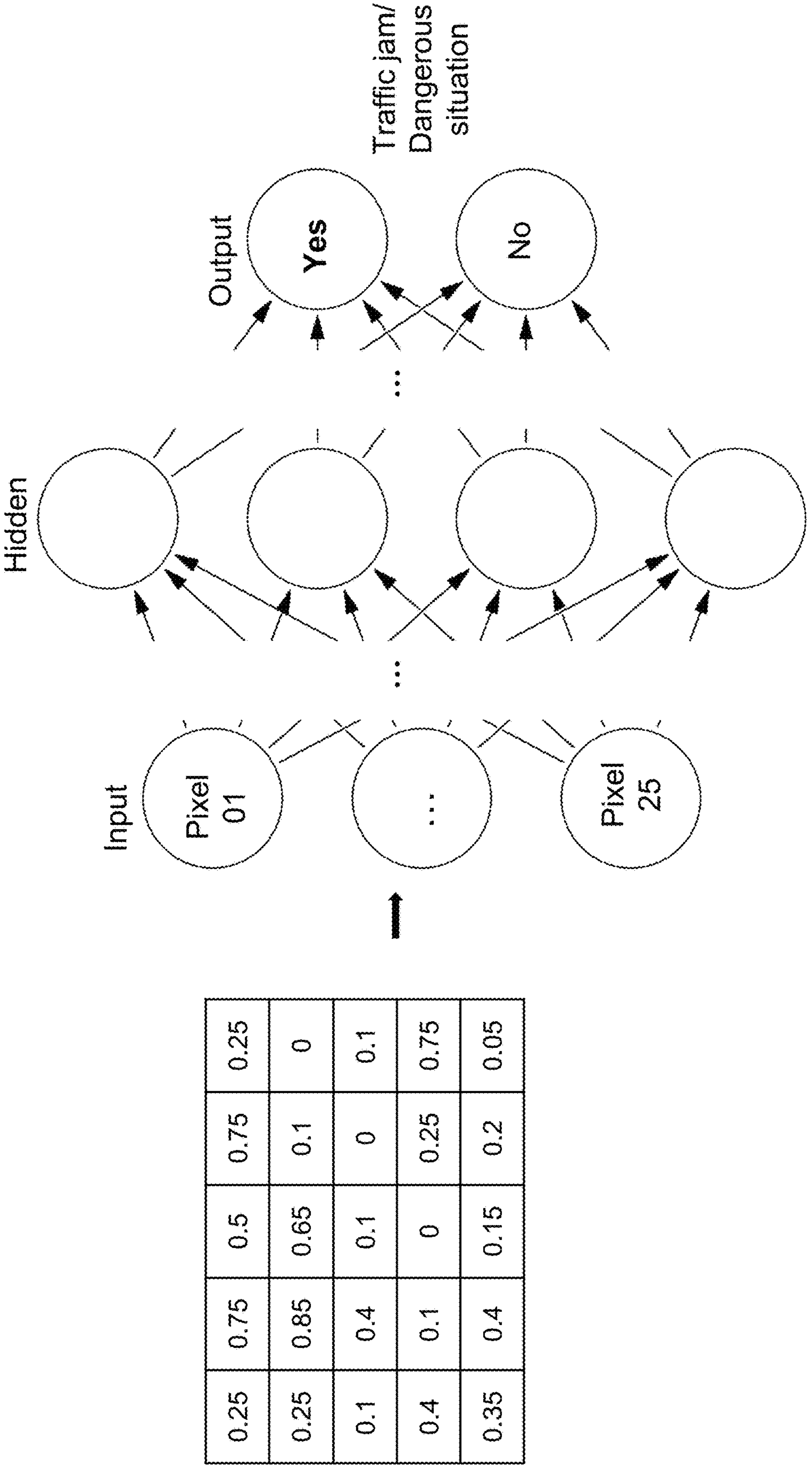
FIG. 8 shows a schematic representation of a neural network.

The created plurality of images is used at 640 as training data for an MLM, for example an ANN. FIG. 8 shows a schematic representation of an artificial neural network, which may be in particular a CNN having an architecture configured for classifying images. The CNN may comprise a plurality of hidden layers, which are only symbolically represented in FIG. 8. The input layer of the CNN consists of a number of nodes equal to the number of pixels in each image, in this case 25, while the output layer consists of two nodes, one associated with a prediction/detection of a traffic jam on the road ("yes") and the other associated with no prediction/detection of a traffic jam ("no"). For example, the numerical output value at the "yes" node and the numerical output value at the "no" node may be values between 0 and 1 such that their sum is one. The node with the highest value provides the result, i.e. whether there is/will be a traffic jam or not.

Each image of the plurality of images may be associated with a respective training output to form the training data. For instance, the training output for each image may be generated using the following rules: if there are a first pixel row having at least two values greater than 0.5 and a second pixel row adjacent to the first pixel row and having at least one value greater than 0.5, the result should be "yes", otherwise "no". According to these rules, the image generated from the first data set, whose pixel grid is also shown in FIG. 8, may be associated with a positive result, i.e. with a prediction/detection of a traffic jam.

The MLM trained on images like the one shown in FIG. 7 helps improve road safety.

The method 600 may be carried out by a single computing device or by a computing system comprising multiple devices.

In another example, the plurality of data values obtained at 610 may be obtained from the table of FIG. 9. The table in FIG. 9 contains data relating to shipments, e.g. in the context of the "just in time" approach or the "just in sequence" approach in manufacturing, in which parts have to be delivered from one location (producer or source warehouse) to another location (processor or target warehouse) in a timely manner. The first column indicates the number of the shipment, wherein the shipments are entered into the table in chronological order. The second column indicates the loading time, e.g. the time taken for the item(s) that have to be shipped to be moved from the source warehouse to the means of transportation, such as a vehicle. The third column of the table indicates the delivery time, e.g. the time taken for the item(s) that have to be shipped to be moved from the means of transportation to the target warehouse. The loading time and the delivery time are measured quantities and they are expressed in minutes. The fourth column of the table indicates whether the shipment has a high carbon footprint (e.g. above a certain threshold). For instance, shipments carried out by means of trains, bulk-delivery trucks and ships may be considered not to have a high carbon footprint while shipments carried out by plane, helicopter or a dedicated land vehicle may be considered to have a high carbon footprint. For instance, a dedicated land vehicle may be a car or truck that performs only one shipment, unlike a bulk-delivery truck that carries out several shipments.

The default means of transportation for the shipments may be those that do not have a high carbon footprint in order to limit the impact on the environment. However, if delays occur and cascade, a shipment with a high carbon footprint may be necessary to compensate for the delays. For instance, after the first 16 shipments with non-high carbon footprint, the 17th shipment has to be made e.g. using an helicopter and is associated with a high carbon footprint.

The loading and delivery times for shipments that do not have a high carbon footprints are pre-processed to obtain the plurality of data values.

In particular, a first mapping function F1 may be applied that assigns 0.75 to each delivery time value (DT) greater than 500, 0.25 to each DT between 470 and 500 (endpoints included), 0 to each DT lower than 470. A second mapping function F2 may be applied that assigns 0.3 to each loading time value (LT) greater than 100, 0.1 to each LT between 80 and 100 (endpoints included), 0 to each LT lower than 80.

After the mapping function, a combination function may be applied that sums the pairs of mapped values for each shipment, i.e. the mapped value for the DT and the one for the LT.

In the example of FIG. 9, the values obtained after applying the mapping functions and the combination function are the plurality of data values. In another (not shown) example, the preprocessing may further comprise quantization (e.g. with an 8-bit quantization that maps into the range [0-255]), so that values returned by the combination function are turned into integers, which then constitute the plurality of data values.

Only some rows of the table are shown in FIG. 9, however the table may comprise hundreds or thousands of rows. As explained, the plurality of data values is obtained from the loading/delivery times of shipments that do not have a high carbon footprint.

The plurality of data sets is created at 620. In a particular example, the size of each data set may be determined based on the shortest sequence of non-high carbon footprint shipments. In particular, it may be equal to the length of this shortest sequence or lower than the length of this shortest sequence, wherein in the latter case it may be assigned by a user or by a computing device. For instance, if L is the length of the shortest sequence of non-high carbon footprint shipments in a table, the cardinality of each set, q, may be set such that q is the highest perfect square lower than or equal to L.

Given q and the group of shipment numbers associated with high carbon footprint $\{h_1, h_2, \ldots, h_g\}$, a first subset of the data sets may comprise the sets corresponding to the rows from $h_a-q$ to $h_a-1$ (endpoints included), for $a=1, \ldots, g$. A second subset may comprise the sets corresponding to the rows from $h_a+1+nq$ to $h_a+(n+1)q$, for $a=1, \ldots, g$ and $n=0, \ldots, w$, wherein w is the largest non-negative integer such that $h_a+(w+1)q<h_{a+1}$. In some cases, w may be 0. The first subset and the second subset may have a non-zero intersection, namely in the cases in which $h_a+(w+1)q=h_{a+1}-1$.

In the example of FIG. 9, L=q=16, the first data set may correspond to rows 1-16, the second data set may correspond to rows 18-33, the third data set may correspond to rows 32-47, the fourth data set may correspond to rows 49-64, the fifth data set may correspond to rows 65-80, the sixth data set may correspond to rows 77-92 and so on. Other ways of dividing the data values into sets may be used.

In an alternative example, the preprocessing functions described above may be applied after having created the data sets.

At 630, the method comprises creating a plurality of images, one for each data set. For instance, FIG. 9 shows on the right a pixel grid having 16 pixels, i.e. the same number of data values as in a data set, wherein the pixel values are given by the data values in the first data set (rows 1-16), in a one-to-one correspondence following a row-major order. The image containing this pixel grid is, thus, created from the first data set. Other similar images are created from the other data sets.

The created plurality of images is used at 640 as training data for an MLM, for example an ANN. An ANN such as the one shown in FIG. 8 and described above may be used, with the only difference that the input layer would comprise 16 nodes and that one of the two output nodes is associated with a prediction of a high carbon footprint shipment (“yes”) and the other associated with no prediction of a high carbon footprint shipment (“no”).

Each image of the plurality of images may be associated with a respective training output to form the training data. For instance, the training output for each image may be generated using the following rules: if the image is associated with shipment numbers r to s, the result should be “yes” if the (s+1)th shipment is a high carbon footprint one, otherwise “no”. For example, images in the first subset defined above would be associated with “yes”, while images in the second subset (and not also in the first subset) would be associated with “no”. According to these rules, the image generated from the first data set, whose pixel grid is shown in FIG. 9, is associated with a positive result, since, indeed, the seventeenth shipment is a high carbon footprint one.

The MLM trained on images like the one in FIG. 9 helps reduce the carbon footprint. In particular, it may be applied to estimates of delivery/loading times and, if it is predicted that the estimates would lead to a delay that would render necessary a shipment with high carbon footprint at a future timepoint, said shipment may be re-scheduled to an earlier time with a vehicle having non-high carbon footprint.

Figure 10:
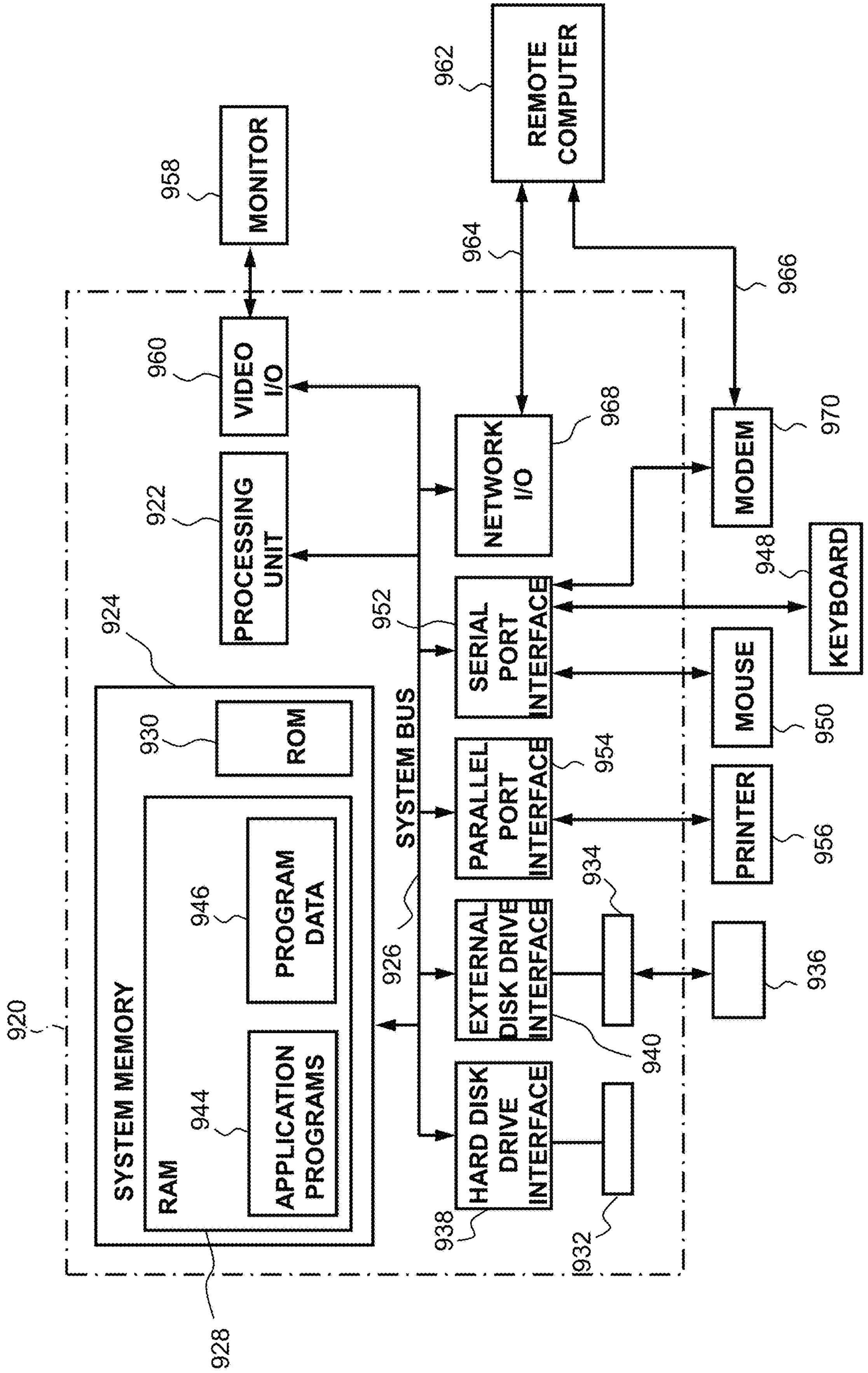
FIG. 10 shows an exemplary computing environment.

FIG. 10 shows an exemplary system for implementing the claimed subject-matter including a general-purpose computing device in the form of a conventional computing environment 920 (e.g., a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random-access memory (RAM) 928 and a read only memory (ROM) 930. A basic input/output system (BIOS) containing the basic routines that helps to transfer information between elements within the computing environment 920, such as during start-up, may be stored in the ROM 930. The system bus 926 may be any of several types of bus structures including a memory bus or memory controller, a peripheral bus, and a local bus using any of a variety of bus architectures.

The computing environment 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the computing environment 920. The data structures may include relevant data for the implementation of the method for data consistency and the method for training an MLM as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946.

A user may enter commands and information, as discussed below, into the computing environment 920 through input devices such as keyboard 948 and mouse 950. Other input devices (not shown) may include a microphone (or other sensors), joystick, game pad, scanner, or the like. These and other input devices may be connected to the processing unit 922 through a universal serial bus (USB) interface 952 that is coupled to the system bus 926, or may be collected by other interfaces, such as a USB port interface

954, game port, a serial port or a parallel port. Further, information may be printed using printer 956. The printer 956, and other parallel input/output devices may be connected to the processing unit 922 through USB interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computing environment 920 may operate in a networked environment using connections to one or more electronic devices. FIG. 10 depicts the computing environment 920 networked with remote computer 962. The remote computer 962 may be another computing environment such as a server, a router, a network PC, a peer device or other common network node, and may include many or all of the elements described above relative to the computing environment 920. The logical connections depicted in FIG. 10 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. In a networked environment, program modules depicted relative to the computing environment 920, or portions thereof, may be stored in a remote memory storage device resident on or accessible to remote computer 962. It will be appreciated that the network connections shown are exemplary and other means of establishing a communications link between the electronic devices may be used.

What is claimed is:

1. A computer-implemented method comprising:

obtaining, by a first computing device, a plurality of first data values;

creating, by the first computing device, a first image comprising a plurality of first pixels, wherein the number of first pixels is equal to the number of first data values and wherein each first data value of the plurality of first data values is assigned to a respective first pixel of the plurality of first pixels;

providing, by the first computing device, the first image as input to an image-classification machine learning model to obtain a first numerical output value;

obtaining, by a second computing device, a plurality of second data values;

creating, by the second computing device, a second image comprising a plurality of second pixels, wherein the number of second pixels is equal to the number of second data values and wherein each second data value of the plurality of second data values is assigned to a respective second pixel of the plurality of second pixels;

providing, by the second computing device, the second image as input to the image-classification machine learning model to obtain a second numerical output value; and sending, by the first computing device, the first numerical output value to a third computing device;

sending, by the second computing device, the second numerical output value to the third computing device;

evaluating, by the third computing device, the first numerical output value and the second numerical output value to determine whether the plurality of first data values is consistent with the plurality of second data values.

2. The computer-implemented method of claim 1, wherein:

evaluating the first numerical output value and the second numerical output value comprises computing a difference between the first numerical output value and the second numerical output value; and the plurality of first data values is consistent with the plurality of second data values when the difference between the first numerical output value and the second numerical output value is below a predetermined threshold.

3. The computer-implemented method of claim 2, further comprising:

sending, by the first computing device, the first image to a third computing device, wherein the first image is provided to the image-classification machine learning model by the third computing device;

sending, by the second computing device, the second image to a fourth computing device, wherein the second image is provided to the image-classification machine learning model by the fourth computing device;

sending, by the third computing device, the first numerical output value to a fifth computing device; and sending, by the fourth computing device, the second numerical output value to the fifth computing device;

wherein the first numerical output value and the second numerical output value are evaluated by the fifth computing device.

4. The computer-implemented method of claim 3, wherein:

obtaining, by the first computing device, the plurality of first data values comprises retrieving a first data set including a plurality of first raw values and deriving the plurality of first data values from the plurality of first raw values by applying one or more data preprocessing techniques; and obtaining, by the second computing device, the plurality of second data values comprises retrieving a second data set including a plurality of second raw values and deriving the plurality of second data values from the plurality of second raw values by applying one or more data preprocessing techniques.

5. The computer-implemented method of claim 4, wherein the method does not comprise training the image-classification machine learning model.

6. The computer-implemented method of claim 5, wherein:

the image-classification machine learning model is configured to classify images containing at least one entity to be classified; and the first image and the second image do not contain any entity to be classified.

7. The computer-implemented method of claim 1, wherein:

the first image is provided to the image-classification machine learning model by the first computing device;

the second image is provided to the image-classification machine learning model by the second computing device;

the method further comprises sending, by the first computing device, the first numerical output value to the second computing device, and/or sending, by the second computing device, the second numerical output value to the first computing device; and the first numerical output value and the second numerical output value are evaluated by the first computing device and/or by the second computing device.

8. The computer-implemented method of claim 1, further comprising:

sending, by the first computing device, the first image to a third computing device; and sending, by the second computing device, the second image to a third computing device;

wherein:

the first image is provided to the image-classification machine learning model by the third computing device;

the second image is provided to the image-classification machine learning model by the third computing device; and the first numerical output value and the second numerical output value are evaluated by the third computing device.

9. One or more non-transitory computer-readable media storing computer-executable instructions that, when executed by a computing system, cause the computing system to:

obtain, by a first computing device, a plurality of first data values;

create, by the first computing device, a first image comprising a plurality of first pixels, wherein the number of first pixels is equal to the number of first data values and wherein each first data value of the plurality of first data values is assigned to a respective first pixel of the plurality of first pixels;

provide, by the first computing device, the first image as input to an image-classification machine learning model to obtain a first numerical output value;

obtain, by a second computing device, a plurality of second data values;

create, by the second computing device, a second image comprising a plurality of second pixels, wherein the number of second pixels is equal to the number of second data values and wherein each second data value of the plurality of second data values is assigned to a respective second pixel of the plurality of second pixels;

provide, by the second computing device, the second image as input to the image-classification machine learning model to obtain a second numerical output value;

send, by the first computing device, the first numerical output value to a third computing device;

send, by the second computing device, the second numerical output value to the third computing device; and evaluate, by the third computing device, the first numerical output value and the second numerical output value to determine whether the plurality of first data values is consistent with the plurality of second data values.

10. The one or more non-transitory computer-readable media of claim 9, wherein:

evaluation of the first numerical output value and the second numerical output value comprises computing of a difference between the first numerical output value and the second numerical output value; and the plurality of first data values is consistent with the plurality of second data values when the difference between the first numerical output value and the second numerical output value is below a predetermined threshold.

11. The one or more non-transitory computer-readable media of claim 10, the instructions that, when executed by a computing system, further cause the computing system to:

sending, by the first computing device, the first image to a third computing device, wherein the first image is provided to the image-classification machine learning model by the third computing device;

sending, by the second computing device, the second image to a fourth computing device, wherein the second image is provided to the image-classification machine learning model by the fourth computing device;

sending, by the third computing device, the first numerical output value to a fifth computing device; and sending, by the fourth computing device, the second numerical output value to the fifth computing device;

wherein the first numerical output value and the second numerical output value are evaluated by the fifth computing device.

12. The one or more non-transitory computer-readable media of claim 11, wherein:

obtaining, by the first computing device, of the plurality of first data values comprises retrieving of a first data set including a plurality of first raw values and deriving of the plurality of first data values from the plurality of first raw values by applying one or more data preprocessing techniques; and obtaining, by the second computing device, of the plurality of second data values comprises retrieving of a second data set including a plurality of second raw values and deriving of the plurality of second data values from the plurality of second raw values by applying one or more data preprocessing techniques.

13. The one or more non-transitory computer-readable media of claim 12, wherein the instructions do not cause the computing system to train the image-classification machine learning model.

14. The one or more non-transitory computer-readable media of claim 9, wherein:

the first image is provided to the image-classification machine learning model by the first computing device;

the second image is provided to the image-classification machine learning model by the second computing device;

the method further comprises sending, by the first computing device, the first numerical output value to the second computing device, and/or sending, by the second computing device, the second numerical output value to the first computing device; and the first numerical output value and the second numerical output value are evaluated by the first computing device and/or by the second computing device.

15. The one or more non-transitory computer-readable media of claim 9, the instructions that, when executed by a computing system, further cause the computing system to:

send, by the first computing device, the first image to a third computing device; and send, by the second computing device, the second image to a third computing device;

wherein:

the first image is provided to the image-classification machine learning model by the third computing device;

the second image is provided to the image-classification machine learning model by the third computing device; and the first numerical output value and the second numerical output value are evaluated by the third computing device.

* * * * *